US00RE44308E

(19) United States
(12) Reissued Patent
Hayashi

(10) Patent Number: US RE44,308 E
(45) Date of Reissued Patent: Jun. 25, 2013

(54) METHOD FOR MANUFACTURING SEAMLESS PIPES OR TUBES

(75) Inventor: Chihiro Hayashi, Sendai (JP)

(73) Assignee: Nippon Steel & Sumitomo Metal Corporation, Tokyo (JP)

(21) Appl. No.: 12/216,381

(22) Filed: Jul. 2, 2008

Related U.S. Patent Documents

Reissue of:
(64) Patent No.: 7,293,443
Issued: Nov. 13, 2007
Appl. No.: 11/485,979
Filed: Jul. 14, 2006

U.S. Applications:
(63) Continuation of application No. PCT/JP2005/000379, filed on Jan. 14, 2005.

(30) Foreign Application Priority Data

Jan. 16, 2004 (JP) ..... 2004-008723

(51) Int. Cl.
*B21B 19/04* (2006.01)

(52) U.S. Cl.
USPC ..... 72/97; 72/95

(58) Field of Classification Search
USPC ..... 72/69, 208, 209, 370.14, 96, 97, 72/95, 99, 100, 38
See application file for complete search history.

(56) References Cited

U.S. PATENT DOCUMENTS 1,923,700 A * 8/1933 Becker ..... 72/97
2,025,148 A * 12/1935 Bannister ..... 72/97
3,798,943 A * 3/1974 Benteler et al. ..... 72/43
4,034,588 A * 7/1977 Way et al. ..... 72/209
4,243,437 A 1/1981 Chill et al.
4,409,810 A 10/1983 Yamada
4,445,354 A 5/1984 Pfeiffer et al.

(Continued)

FOREIGN PATENT DOCUMENTS

EP 485 627 5/1992
EP 0 769 563 4/1997

(Continued)

OTHER PUBLICATIONS

C. Hayashi, "Manufacturing Method of Steel Pipe", Iron and Steel Institute of Japan, Oct. 10, 2000, pp. 123-129.

*Primary Examiner* — Edward Tolan
(74) *Attorney, Agent, or Firm* — Clark & Brody

(57) ABSTRACT

A method for manufacturing a seamless pipe, capable of preventing the carburization phenomenon that occurs in a manufacturing process of pipe and simplifying an elongation rolling process, is provided. In this method, after piercing in the piercing rolling process, rolling is performed without using an inside regulating tool in the elongation rolling process, or without performing the elongation rolling followed by reducing rolling in a reducing rolling process, and [thickening] *reducing the wall thickness* is then performed by use of a cold mill or cold draw bench in a cold rolling process. According to this method, the trap of graphite fine particles in the inner and outer surfaces of the pipe that took place in the conventional elongation rolling process can be minimized to prevent the carburization of the pipe. The method of the present invention is effective, particularly as a measure for preventing the carburization of an ultra-low carbon stainless steel or high alloy steel.

8 Claims, 4 Drawing Sheets

U.S. PATENT DOCUMENTS

| | | | | | |
|---|---|---|---|---|---|
| 4,470,282 | A | * | 9/1984 | Hayashi | 72/97 |
| 4,577,481 | A | | 3/1986 | Staat | |
| 4,578,974 | A | | 4/1986 | Pozsgay et al. | |
| 4,594,221 | A | | 6/1986 | Caron et al. | |
| 4,798,071 | A | * | 1/1989 | Staat et al. | 72/97 |
| 4,809,423 | A | * | 3/1989 | Petersen | 29/527.7 |
| 4,928,507 | A | * | 5/1990 | Staat et al. | 72/38 |
| 4,991,419 | A | | 2/1991 | Kuroda et al. | |
| 5,109,689 | A | | 5/1992 | D'Avanzo | |
| 5,501,091 | A | | 3/1996 | Hayashi | |
| 5,661,116 | A | | 8/1997 | Periard | |
| 6,892,559 | B2 | * | 5/2005 | Leiponen | 72/38 |

FOREIGN PATENT DOCUMENTS

| | | | |
|---|---|---|---|
| EP | 769 536 | | 4/1997 |
| EP | 1 264 905 | | 8/1998 |
| GB | 1 353 430 | | 5/1974 |
| GB | 2 182 054 | | 5/1987 |
| JP | 59-094514 | | 5/1984 |
| JP | 61-162217 | * | 7/1986 |
| JP | 3-27805 | * | 2/1991 |
| JP | 03-027805 | | 2/1991 |
| JP | 04-111907 | | 4/1992 |
| JP | 04-168221 | | 6/1992 |
| JP | 5-70782 | * | 3/1993 |
| JP | 05-023842 | | 4/1993 |
| JP | 08-004811 | | 1/1996 |
| JP | 9-78162 | | 3/1997 |
| JP | 10-005818 | | 1/1998 |
| JP | 10-058013 | | 3/1998 |
| JP | 10-230306 | * | 9/1998 |
| JP | 2000-24705 | * | 1/2000 |
| JP | 2001-105007 | * | 4/2001 |
| JP | 2002-285261 | | 10/2002 |
| WO | WO 2004/108310 | | 12/2004 |

* cited by examiner

METHOD FOR MANUFACTURING SEAMLESS PIPES OR TUBES

Matter enclosed in heavy brackets [ ] appears in the original patent but forms no part of this reissue specification; matter printed in italics indicates the additions made by reissue.

CROSS-REFERENCE TO RELATED APPLICATIONS

This application is a continuation of International Patent Application No. PCT/JP2005/000379 filed Jan. 14, 2005. This PCT application was not in English as published under PCT Article 21(2).

TECHNICAL FIELD

The present invention relates to a method for manufacturing seamless pipes or tubes (hereinafter generally referred to as "pipes"), capable of fundamentally simplifying a manufacturing process of seamless pipes and preventing carburization that occurs in the manufacturing process of seamless pipes.

BACKGROUND ART

Seamless steel pipes have been manufactured by means of a Mannesmann plug-mill process, a Mannesmann-mandrel mill process, a Mannesmann-Assel mill process, a Mannesmann-push bench mill process, and the like. These processes comprise piercing a solid-core billet heated to a predetermined temperature in a heating furnace by a piercing mill to form a hollow bar-like hollow piece, reducing mainly the wall thickness thereof by an elongator such as a plug mill, a mandrel mill, an Assel mill or a push bench mill, in order to form a hollow shell, and reducing mainly the outer diameter thereof by a reducing mill such as a sizer or a stretch reducer to form a seamless steel pipe of a predetermined dimension.

The present invention-relates to an elongation rolling process that is the second step of such a seamless pipe manufacturing process. Although the present invention will be described hereinafter based on the Mannesmann-mandrel mill process, the same effect can also be obtained in an elongation rolling process of the other pipe manufacturing processes.

FIG. 1 is a view showing the Mannesmann-mandrel mill process, wherein (a) shows a rotary hearth heating furnace, (b) a piercer (piercing mill), (c) a mandrel mill (elongator), (d) a reheating furnace and (e) a stretch reducer (reducing mill).

In the past, a full-floating-type mandrel mill was generally used to continuously roll a hollow shell 2 with a mandrel bar 1 through grooved rolls 3, wherein the mandrel bar 1 was inserted inside of the hollow shell, as shown in (c) of FIG. 1, Recently, a semi-floating-type mandrel mill (also called a restrained mandrel mill) becomes common as a mandrel mill of further high efficiency and high quality.

FIG. 2 is a comparative view of the full-floating-type mandrel mill and the semi-floating-type mandrel mill, wherein (a) shows the full-float mandrel mill and (b) the semi-floating-type mandrel mill.

The semi-floating-type mandrel mill shown in (b) of FIG. 2 includes a full-retract system where the mandrel bar 1 is hold and constrained by a mandrel bar retainer 4 up to the end of rolling, and pulling back the mandrel bar 1 simultaneously at the end of rolling, and a semi-float system for releasing the mandrel bar 1 simultaneously at the end of rolling. Generally, the full-retract system is adopted for manufacturing middle size seamless pipes, and the semi-float system for manufacturing small size seamless pipes.

In the full-retract system, an extractor is connected to the outlet side of the mandrel mill, and a hollow shell is pulled out during rolling by the mandrel mill. If the temperature of the pipe at the outlet side of the mandrel mill is sufficiently high, the pipe is pulled out by a sizing mill or stretch reducer instead of the extractor, which results in be reduced to a final target dimension without reheating.

A lubricant is applied onto the surface of the mandrel bar for the purpose of reducing the friction between the pipe's inner surface and the mandrel bar surface to prevent scratching of the pipe's inner surface and sticking flaws on the mandrel bar surface, and also for the purpose of easy stripping of the mandrel bar after elongation rolling.

In the past, water-soluble oil based on heavy oil containing fine powdery graphite was used as the lubricant, or fine powdery graphite was sprayed onto the surface of an oil-coated mandrel bar and used as the lubricant.

Recently, a non-graphitic lubricant called borax, a scale-melting agent, is increasingly used as a smokeless lubricant. At the time of elongation rolling of the stainless steel pipes and high alloy steel pipes, particularly, mica-based non-graphitic lubricants can be used.

The following Patent Document 1 discloses a method for manufacturing a small size seamless pipe, characterized by diameter-reducing and elongating a hollow shell made by piercing in a cold rolling process. In this method, a hot elongation rolling process by the use of the mandrel mill is omitted. However, this omission is only for simplifying the pipe manufacturing process. not for preventing the carburization of pipes in the hot elongation rolling process by use of mandrel mill. There is no description about the prevention of carburization in the Patent Document 1.

[Patent Document 1]

Japan Patent Unexamined Publication No. H10-58013

When a stainless steel pipe or high alloy steel pipe is elongated by use of the mandrel mill, a carburization phenomenon occurs on the inner or outer surfaces of a resulting pipe product, particularly, on the inner surface thereof. Carburization has an undesirable influence such as deterioration of corrosion resistance on the pipe product. This carburization phenomenon is extremely troublesome, which occurs in the use of non-graphitic lubricants or graphitic lubricants. The previous use of graphitic lubricants results in graphite fine powder being suspended in the air of a pipe factory and adhering to *the inner and outer surfaces of the pipe and* the mandrel bar.

DISCLOSURE OF THE INVENTION

[Problems to be Solved by the Invention]

It is the objective of the present invention to provide a method for manufacturing a seamless pipe, in which an elongation rolling process is omitted for preventing a carburization phenomenon which occurs in the manufacturing process of seamless pipes, particularly, low-carbon stainless steel pipes, high alloy steel pipes, and the like.

[Means for Solving the Problems]

As a result of studies to solve the above problem, the present inventor invented a method for manufacturing a seamless pipe, which is described below.

(1) A method for manufacturing a seamless pipe having no carburization layer in the inner and the outer surface layer parts, characterized by that the steel stock is pierced in a piercing rolling process, rolled without using an inside regulating tool in the elongation rolling process, reduced in a reducing rolling process, and then [thickened] *thickness controlled* by the use of a cold mill or a cold draw bench in the cold rolling process.

(2) A method for manufacturing a seamless pipe having no carburization layer in the inner and the outer surface layer parts, characterized by that a heated steel stock is pierced, reduced without performing elongation rolling, and successively [thickened] *thickness-controlled* by the use of a cold mill or a cold draw bench in the cold rolling process.

The piercing rolling in the methods of (1) and (2) is preferably performed by means of toe angle piercing. The toe angle piercing means piercing with a toe angle (γ) described below being set to 5° or more. The piercing is particularly preferably performed with a toe angle ranging from 20 to 30°.

The phrase of "no carburization layer in the inner and the outer surface layer parts" means that the average carbon content (mass %) in a layer 0.1 mm thick at a depth from 0.1 to 0.2 mm of each of the inner surface and the outer surface of the pipe is not larger than a value obtained by adding 0.01 mass % to the carbon content (mass %) of a pipe material.

(3) A method for manufacturing a seamless pipe according to (1) or (2), wherein a billet or bloom of stainless steel or high alloy steel, particularly of an ultra-low carbon stainless steel or high alloy steel, is used as the steel stock.

The knowledge obtained from various tests carried out for solving the above-mentioned problems is as follows.

(a) The carburization phenomenon at the inside and outside of a pipe in the manufacturing process of a seamless pipe is caused as follows. Namely, fine particles of a carbonaceous material (hereinafter referred to as "graphite fine particles"), such as graphite, are present in the air of the pipe manufacturing factory as described above, and these are trapped on the bottom portion of grooved roll. Since the inside of the pipe is never washed with cooling water, the graphite fine particles are easily trapped therein, compared to the outside of the pipe. These graphite fine particles are diffused or gasified in the following reheating, and they penetrate into the pipe wall causing carburization.

Although the graphite fine particles are not trapped as much on the flange portion of the grooved roll, the outer surface part of the pipe contacting with the flange portion of the grooved roll of a previous stands contacts to the bottom portion of the grooved roll. Therefore, the graphite fine particles are bonded by pressure onto the whole inner and outer surfaces of the pipe after the pipe has passed through all stands.

(b) The carburization phenomenon may be suppressed by extending the reducing rolling area on the flange portion of the roll and by narrowing the elongation rolling area on the bottom portion thereof at the time of elongation rolling. Nevertheless, the prevention of carburization is not perfect. To perfectly prevent the carburization, it is preferred to use the mandrel mill as a reducing mill such as a sizer or reducer without inserting the mandrel bar into the pipe as an inside regulating tool, or omit the elongation rolling process itself.

(c) When the manufacturing method of seamless pipe is realized by not using the mandrel bar in the elongation rolling process or by omitting the elongation rolling process itself, the wall [thickening] *thickness-controlling* by the elongation rolling process can be allotted to the piercing process that is a preprocess or the cold rolling process that is a post process.

The above-mentioned (a) will be further described in detail.

Numerous graphite fine particles are floating in the air of a factory building in which hot rolling of pipe takes place. The graphite fine particles could be floating in a factory where graphitic lubricants had been used in the past and non-graphitic lubricants are used at the present time. Of course, if the graphitic lubricants are used, the lubricants applied to the mandrel bar directly cause carburization.

FIG. 3 is a cross-sectional view of a steel stock during elongation rolling, wherein the state of stress during deformation in the mandrel mill is shown.

$\sigma_1$: Axial stress $\sigma_{74}$: Circumferential stress $\sigma_{ra}$: Radial stress of pipe inner surface $\sigma_{rb}$: Radial stress of pipe outer surface $\sigma_r$: Average value of radial stress, that is, $\sigma_r=(\sigma_{ra}+\sigma_{rb})/2$ $k_f$: Deformation resistance Symbols with prime (dash) show the flange portion, and symbols without it show the bottom portion.

The grooved roll can be divided into the bottom portion and the flange portion, depending on whether or not a pipe inner surface 5 is in contact with the mandrel bar 1. The pipe portion corresponding to the bottom portion is rolled while receiving external pressure from the roll and while receiving internal pressure from the mandrel bar 1. Therefore, the pipe portion corresponding to the bottom portion is elongated in the axial direction and also is broadened in the circumferential direction. On the other hand, the pipe portion corresponding to the flange portion is pulled by the elongation of the pipe portion corresponding to the bottom portion and elongated, and also narrowed in the circumferential direction. Namely, in the plastic deformation of the pipe in the mandrel mill, the pipe portion corresponding to the bottom portion is deformed under external pressure, internal pressure and axial compression, while the pipe portion corresponding to the flange portion is deformed under external pressure and axial tension because the internal pressure is zero. Therefore, the stress on the bottom portion is in a three-axial compression state, and the inner and outer surface pressures on the bottom portion are highly raised, compared with those on the flange portion.

FIG. 4 is a view showing the stress distribution in each stand. As shown in the drawing, "$\sigma_r/k_f$" is −1.6 to −1.5 on the bottom portion. On the contrary, "$_r'/k_f$" on the flange portion is about −0.06 to −0.04. Namely, the surface pressure on the flange portion is as little as about 1/20 to 1/40 of the surface pressure on the bottom portion, which is almost ignorably small. Therefore, the graphite fine particles are easily trapped in the inner and outer surfaces of the pipe portion corresponding to the bottom portion of the grooved roll, but are hardly trapped at all on the flange portion thereof. The detail for the stress distribution of FIG. 4 is described in the following Non-Patent Document 1.

[Non-Patent Document 1]

"Manufacturing Method of Steel Pipe", Chihiro Hayashi, Oct. 10, 2000, issued by Iron and Steel Institute of Japan, pp. 123-129

When the pipe contacts the bottom portion of the grooved roll in the mandrel mill, the graphite fine particles trapped in the inner and outer surfaces of the pipe are diffused into the wall thickness direction of the pipe in the following reheating process, causing the carburization phenomenon. In using a grooved roll having a flange-portion area larger than the bottom-portion, the carburization phenomenon is remarkably reduced. In other words, in the mandrel mill, the carburization phenomenon is reduced as the wall thickness reduction quantity becomes smaller. The knowledge described above is in case of the elongation rolling of the two-roll type and the same in case of that of the three-roll type.

In the final reducing rolling process, the pipe is deformed under external pressure and axial tension. Since this deformation is the same as the deformation on the flange portion of the grooved roll in the mandrel mill and the surface pressure is excessively minimized, the trapped graphite fine particle is minimal.

[Best Mode for Carrying out the Invention]

Preferred embodiments of the present invention will be described in detail below.

1. Steel Stock

Although iron and iron alloys will be described hereinafter as material of steel stocks, non-iron materials and alloys thereof may be used. The steel stocks include a round billet made by blooming, a round bloom made by continuous casting, and the like. With respect to the chemical composition of the steel stocks, carbon steel and low alloy steel have been used for manufacturing oil well pipes, structural pipes, plumbing tubes and the like, and stainless steel used for manufacturing boiler pipes and plumbing tubes, and high alloy steel used for manufacturing chemical industrial tubes. However, in recent years, high alloy steel is increasingly used for manufacturing oil well pipes. The present invention has an eminent effect on the steel such as an ultra-low carbon stainless steel or high alloy steel that is hard to work and carburizes easily.

2. Piercing Process

Since the inside regulating tool (mandrel bar) is not used in the elongation rolling process, or the elongation rolling process itself is omitted in the present invention, wall [thickening] *thickness-controlling* which is naturally performed in the mandrel mill must be allotted by a piercing process that is a preprocess or a cold rolling process that is a post process, or by both processes.

In order to make a thin hollow piece by performing a large [thickening] *thickness-controlling* work in the piercing process, for example, methods disclosed in the following Patent Document 2 and Patent Document 3 and a method filed as a patent application No. PCT/JP2004/7698 by the present applicant can be adopted. These methods can remarkably suppress the rotary forging effect in the piercing process, and also definitely suppress inner surface flaws or lamination which are likely to occur in piercing that makes thin hollow shell of hardly workable materials such as stainless steel and high alloy steel with high degree of working.

[Patent Document 2] Japan Patent Examined Publication No. H5-23842

[Patent Document 3] Japan Patent Examined Publication No. H8-4811

FIG. 5 is a view showing an aspect of piercing rolling. As shown in the drawing, cone-shaped rolls 8 are arranged laterally or vertically across the pass line of a billet 6 and a hollow shell 7. The angle of the axial line of these rolls to the horizontal plane or vertical plane of the pass line is an inclination β (not shown). The angle of the axial line of the rolls to the vertical plane or horizontal plane of the pass line is a toe angle γ.

In the present invention, piercing with the toe angle γ set to 5° or more is referred to as toe angle piercing. In carrying out the method of the present invention, this toe angle piercing is desirably adopted, in which a high elongation work is performed in the piercing process. More preferably, the piercing is performed with a toe angle of 20 to 30°.

3. Elongation Rolling Process

In the mandrel mill, as described above, elongation rolling and reducing rolling are performed on the bottom portion of grooved rolls and on the flange portion thereof, respectively. The carburization phenomenon can be suppressed by extending the reducing rolling area on the flange portion and by narrowing the elongation rolling area on the groove bottom portion. However, since only the narrowing of the elongation rolling area cannot lead to a perfect suppression of the carburization, it needs to roll the hollow shell without inserting, into the inside of the pipe, the mandrel mill that is used as an inside regulating tool. Namely, the mandrel mill is used as a reducing mill such as a sizer or reducer. The elongation rolling process by the mandrel mill itself can be omitted, whereby the manufacturing cost can be remarkably reduced.

4. Cold Rolling Process or Cold Drawing Process

Fortunately, stainless steel pipes and high-alloy steel pipes are almost always sent to a cold rolling factory and made into products through the cold rolling process or cold drawing process. Therefore, spiral marks that inevitably occur in the piercing rolling process can be extinguished in the final cold rolling process even if elongation work is not performed in the elongation rolling process to smoothen the inner and outer surfaces of the pipes.

The cold rolling and cold drawing are performed for the purpose of enhancing mechanical properties of the products and also finishing the products to target dimensions. The cold rolling can be performed by use of a cold pilger mill having a pair of reciprocating grooved rolls while inserting the mandrel bar to the inside, and the cold drawing can be performed by use of a draw bench.

EXAMPLES

Examples of the present invention will be further described. Example 1 is an example of the application of piercing that makes a thin hollow shell and Example 2 is an example of the application of cold rolling with high degree of working.

Example 1

A 60 mm billet with a diameter of 18% Cr-8% Ni austenite-based stainless steel was used as a sample and subjected to piercing with an extension ratio of 1.5 at a temperature of 1250° C. in order to provide a hollow shell with an outer diameter of 90 mm and a thickness of 2.7 mm. The outer diameter of the shell was reduced to 45 mm (wall thickness 3.5 mm) at the same temperature followed by cooling, and then cold-rolled by use of a cold pilger mill so as to have an outer diameter of 25 mm and a thickness of 1.65 mm. A pilot mill was used in the hot rolling process, and an actual production mill was used in the cold rolling process.

Since the elongation rolling process was omitted in the hot rolling process, no carburization phenomenon was observed in the inner and outer surfaces of the product pipe. Specifically, compared to the content of carbon of the steel stock, the average content of carbon in each layer, at a depth from 0.1 mm to 0.2 mm of the inner and the outer surface layer parts of the pipe, increased by 0.01% or less. Spiral marks occurred in piercing rolling were also perfectly extinguished by the cold elongation rolling by the cold pilger mill, and inner and outer surfaces were excellent.

The test conditions are as follows.

1. Piercing Rolling Condition (Refer to FIG. 5)

| | |
|---|---|
| Cross angle | γ = 25° |
| Inclination | β = 12° |
| Plug diameter | $d_p$ = 80 mm |
| Billet diameter | $d_o$ = 60 mm |
| Hollow shell diameter | d = 90 mm |
| Hollow shell thickness | t = 2.7 mm |

-continued

| | |
|---|---|
| Expansion ratio | $d/d_o = 1.50$ |
| Piercing ratio | $do^2/4t(d - t) = 3.82$ |
| Thickness/outer diameter ratio | $(t/d) \times 100 = 3.0\%$ |

2. Reducing Rolling Condition (Rolling Condition by a Sinking Reducer)
   Hollow shell dimension: Outer diameter 90 mm, thickness 2.7 mm
   Rolling dimension: Outer diameter 45 mm, thickness 3.5 mm
   Rolling ratio: 1.62
3. Cold Rolling Condition
   Hollow shell dimension: Outer diameter 45 mm, thickness 3.5 mm
   Rolling dimension: Outer diameter 25 mm, thickness 1.65 mm
   Rolling ratio: 3.77

Example 2

Hot workability of high alloy steel is inferior compared to stainless steel, and a piercing temperature exceeding 1275° C. frequently causes lamination. Therefore, in this example, a 85 mm diameter billet of 25% Cr-35% Ni-3% Mo high alloy steel (with C content of 0.01%) was used as a sample, and it was pierced with an expansion ratio of 1.06 at a temperature of 1200° C. in order to provide a hollow shell with an outer diameter of 90 mm and a thickness of 5.4 mm. Then, outer diameter of the hollow shell was reduced to 50 mm (wall thickness 6.2 mm) at the same temperature followed by cooling, and rolling that makes thin hollow shell with high degree of working was performed thereto by the use of the cold pilger mill so as to have an outer diameter 25 mm and a thickness 1.65 mm. The inner and outer surfaces were excellent, and no carburization phenomenon was observed. Specifically, compared with the carbon content (0.01%) of the base material, the increase in average content of carbon in each layer at a depth from 0.1 mm to 0.2 mm of the inner and outer surface layer parts was 0.01% or less, or the average carbon content of the layer was 0.02% or less.

The test conditions were as follows.

1. Piercing Rolling Condition

| | |
|---|---|
| Cross angle | $\gamma = 30°$ |
| Inclination | $\beta = 12°$ |
| Plug diameter | $d_p = 75$ mm |
| Billet diameter | $d_o = 85$ mm |
| Hollow shell diameter | $d = 90$ mm |
| Hollow shell thickness | $t = 5.4$ mm |
| Expansion ratio | $d/d_o = 1.06$ |
| Piercing ratio | $d_o^2/4t(d - t) = 3.95$ |
| Thickness/outer diameter ratio | $(t/d) \times 100 = 6.0\%$ |

2. Reducing Rolling Condition (Rolling Condition by a Sinking Reducer)
   Hollow shell dimension: Outer diameter 90 mm, thickness 5.4 mm
   Rolling dimension: Outer diameter 50 mm, thickness 6.2 mm
   Rolling ratio: 1.68
3. Cold Rolling Condition
   Hollow shell dimension: Outer diameter 50 mm, thickness 6.2 mm
   Rolling dimension: Outer diameter 25 mm, thickness 1.65 mm
   Rolling ratio: 7.05

INDUSTRIAL APPLICABILITY

The problems of inner surface flaws or lamination (double cracking in the wall thickness center) which occur at the time of piercing a stainless steel pipe or a high-alloy steel pipe, in a so-called Mannesmann process represented by a mandrel mill process, were already solved by the prior invention made by the present inventors (filed as an application No. PCT/JP2004/7698). The remaining problem of carburization in the mandrel mill can also be solved by the present invention. Until the present time, stainless steel pipes, high alloy steel pipes and the like have been manufactured by an Ugine Sejournet extrusion process, but uneven thickness characteristics of the products made by that extrusion process are determinately inferior to those of products made by the Mannesmann process.

It is well known that the largest disadvantage of the Ugine pipe-making process is the high manufacturing cost. Further, since billet cutting work, countermeasures for wear of tools and removing work of glass that is used for lubricant, are also costly, the manufacture of lengthy pipes is not possible. Above all, the production efficiency is also determinately inferior, compared with that of the Mannesmann process. The manufacturing method of the present invention is definitely more efficient.

DESCRIPTION OF REFERENCE NUMERALS

Figure 1:
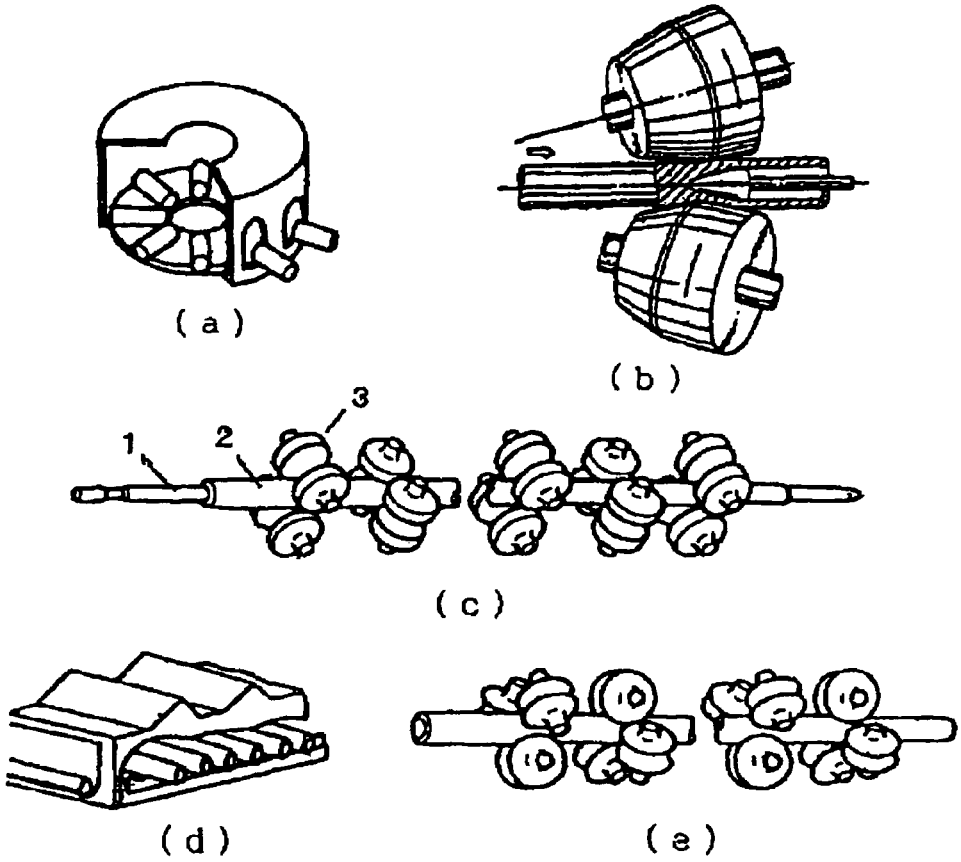
FIG. 1 is an illustrative view of a Mannesmann mandrel mill process.
Figure 2:
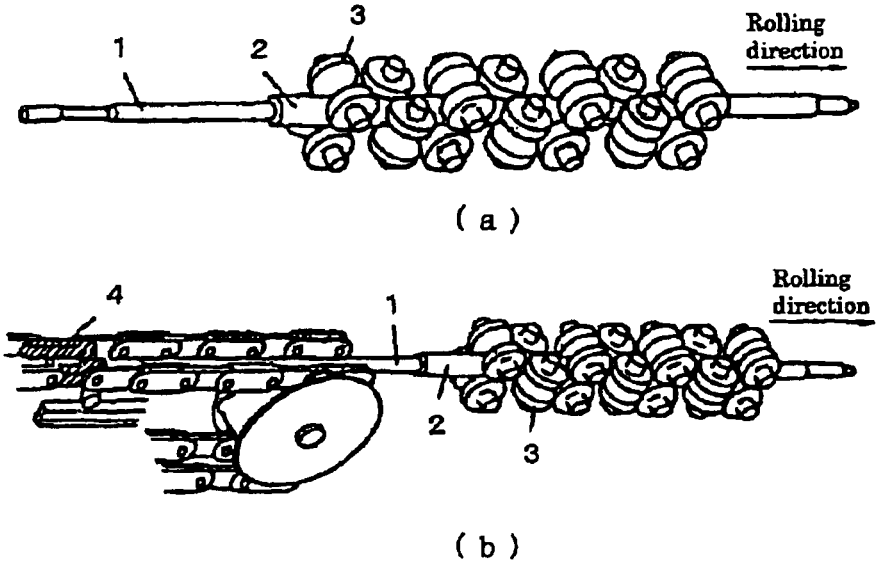
FIG. 2 is an illustrative view of a full-floating type mandrel mill and a semi-floating-type mandrel mill.
Figure 3:
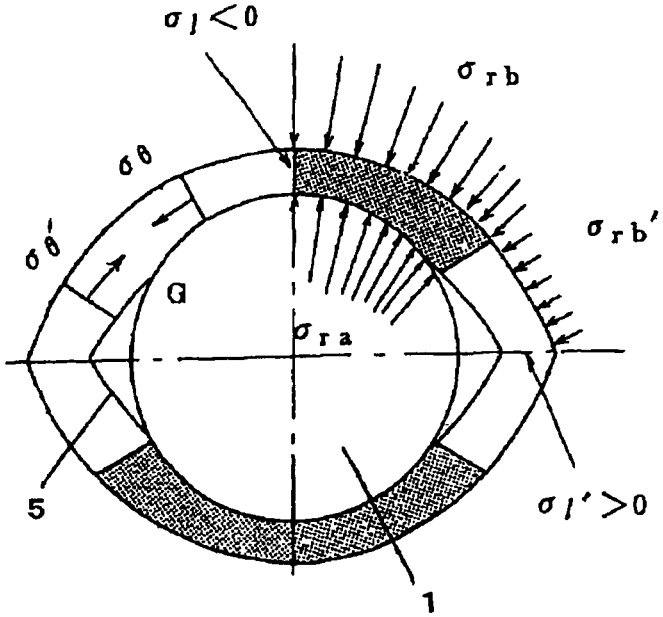
FIG. 3 is a cross-sectional view of a steel stock to be rolled, which shows the state of stress during deformation in the mandrel mill.
Figure 4:
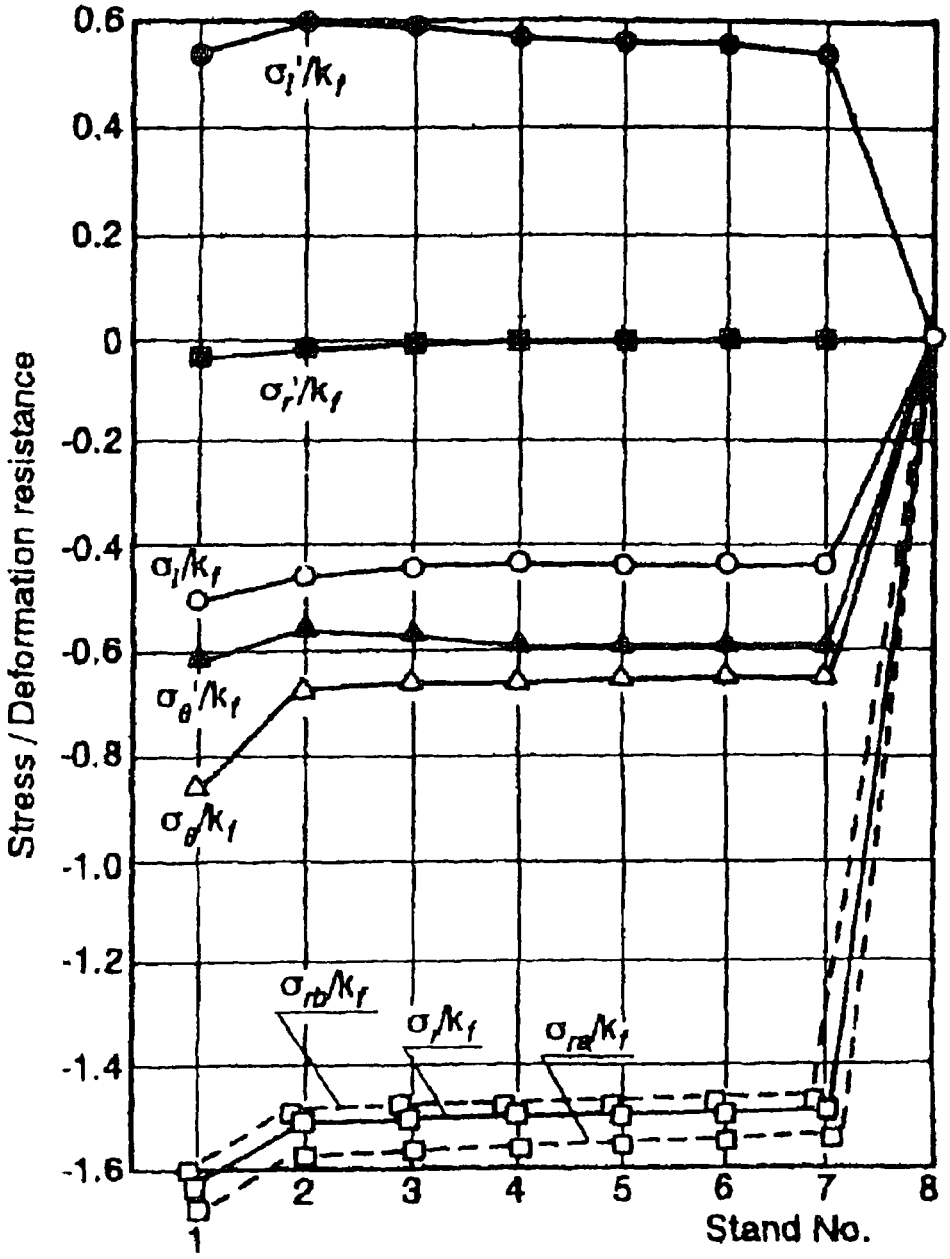
FIG. 4 is a view showing the transition of stress in each stand of the mandrel mill.
Figure 5:
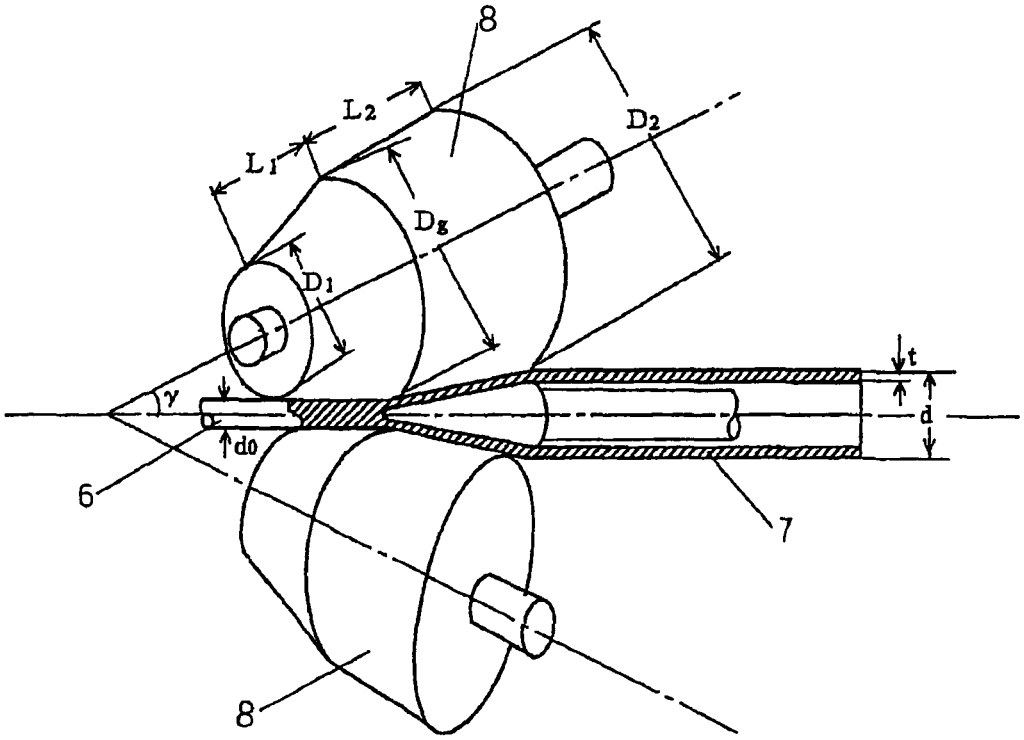
FIG. 5 is a view showing an aspect of piercing rolling.

1. Mandrel bar
2. Steel stock to be rolled
3. Roll
4. Bar retainer
5. Pipe inner surface
6. Billet
7. Hollow shell
8. Roll

The invention claimed is:

1. A method for manufacturing a seamless pipe having no carburization layer in the inner and the outer surface layer parts, characterized by that, in the manufacturing process of a seamless pipe comprising heating, piercing rolling, elongation rolling, reheating and *diameter*-reducing rolling of a steel stock, the steel stock is pierced in a piercing rolling process, rolled without performing elongation *by* using [a mill having] no inside regulating tool in an elongation rolling process, *diameter*-reduced in a reducing rolling process, and then [thickened by the use of] *cold rolled using* a cold mill or a cold draw bench [in a cold rolling process] *to reduce a wall thickness of the seamless pipe*.

2. A method for manufacturing a seamless pipe according to claim 1, wherein the piercing rolling is performed by a cross piercing.

3. A method for manufacturing a seamless pipe according to claim 2, wherein a billet or bloom of stainless steel or high alloy steel, particularly of an ultra-low carbon stainless steel or high alloy steel, is used as the steel stock.

4. A method for manufacturing a seamless pipe according to claim 1, wherein a billet or bloom of stainless steel or high alloy steel, particularly of an ultra-low carbon stainless steel or high alloy steel, is used as the steel stock.

5. A method for manufacturing a seamless pipe having no carburization layer in the inner and the outer surface layer parts, characterized by that a heated steel stock is piercing-rolled, *diameter*-reducing-rolled without performing elongation *rolling*, and successively [thickened by the use of] *cold rolled using* a cold mill or a cold draw bench [in a cold rolling process] *to reduce a wall thickness of the seamless pipe*.

6. A method for manufacturing a seamless pipe according to claim 5, wherein the piercing rolling is performed by a cross piercing.

7. A method for manufacturing a seamless pipe according to claim 5, wherein a billet or bloom of stainless steel or high alloy steel, particularly of an ultra-low carbon stainless steel or high alloy steel, is used as the steel stock.

8. A method for manufacturing a seamless pipe according to claim 6, wherein a billet or bloom of stainless steel or high alloy steel, particularly of an ultra-low carbon stainless steel or high alloy steel, is used as the steel stock.

* * * * *